Oct. 4, 1966 B. D. LOUGHLIN 3,277,384

BALANCED FREQUENCY DETECTOR APPARATUS

Filed Nov. 4, 1963 2 Sheets-Sheet 1

3,277,384
Patented Oct. 4, 1966

3,277,384

BALANCED FREQUENCY DETECTOR APPARATUS

Bernard D. Loughlin, Centerport, N.Y., assignor to Hazeltine Research, Inc., a corporation of Illinois Filed Nov. 4, 1963, Ser. No. 321,019
2 Claims. (Cl. 329—134)

Figure 1:
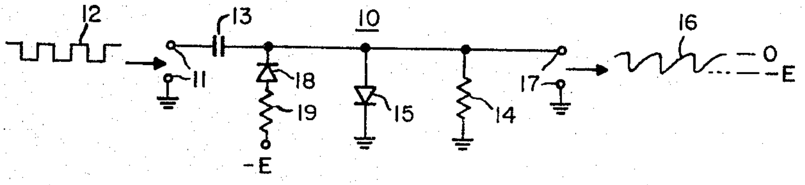

This invention relates to wave signal frequency detector apparatus. While it is useful as either a phase-modulation or frequency-modulation detector circuit, it will be described as a frequency modulation detector circuit for the subcarrier channel of an FM/FM multiplex radio receiver.

In an FM/FM multiplex broadcast system, for example, one utilizing substciption-type SCA (Subsidiary Communications Authorization) signals, an audio-frequency signal representing the main program is frequency-modulated onto the main carrier signal and another audio-frequency signal, representing the subcarrier program, is frequency-modulated onto a subcarrier signal. This modulated subcarrier is then frequency-modulated onto the main carrier to form the composite FM/FM multiplex signal. When it is desired to reproduce the subcarrier program at the multiplex receiver, it is necessary to detect the frequency-modulated subcarrier from the main carrier, separate it, and then detect the audio-frequency signal from the subcarrier. It has been found that, even if adequate filtering is used to prevent any direct feed-through (crosstalk) of the main audio-frequency signal into the subcarrier channel, there is still a small amount of crosstalk that remains which can cause an annoying background interference with the subcarrier program. Investigation has shown that this residual crosstalk may result from amplitude modulation of the subcarrier by the main audio-frequency signal. If the detector in the subcarrier channel is not properly designed so as to be "balanced," that is to say, so as to be insensitive to amplitude modulation of the subcarrier signal, this amplitude modulation will be detected and reproduced right along with the subcarrier program. While it is possible to design an FM detector that is substantially insensitive to such amplitude variations in the subcarrier signal, the techniques used are very often too complex and expensive to be incorporated into low-cost multiplex receivers.

It is, therefore, an object of the invention to provide an inexpensive and simply constructed frequency detector apparatus that is effectively balanced against undesired amplitude variations in the applied signal.

It is further an object of the invention to provide balanced frequency detector apparatus incorporating a pulse-counter circuit for the subcarrier channel of an FM/FM multiplex broadcast signal receiver.

In accordance with the invention, the balanced frequency detector apparatus comprises means for supplying a frequency modulated wave signal subject to undesired peak-to-peak amplitude variations and means for differentiating the wave signal, and for rectifying the differentiated signal to derive a first train of same polarity pulses having an average component jointly representative of the frequency and amplitude variations of the signal, and means responsive to the peak amplitude of the pulses for non-linearly limiting the first train of pulses such that pulses of higher peak amplitude are limited to a proportionately greater extent than pulses of lower peak amplitude, thereby developing a train of output pulses having an average component representative of the frequency of the wave signal and being substantially free from the effects of the undesired amplitude variations.

For a better understanding of the present invention together with other and further objects thereof, reference is had to the following description taken in connection with the accompanying drawings, and its scope will be pointed out in the appended claims.

Figure 4A:
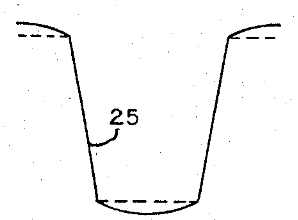
Figure 4B:
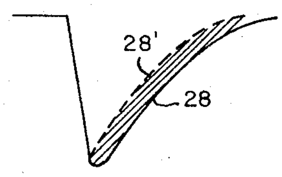
Figure 5:
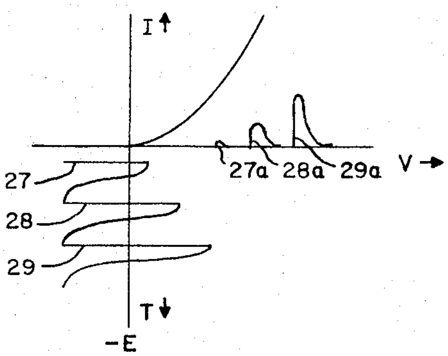
Figure 6:
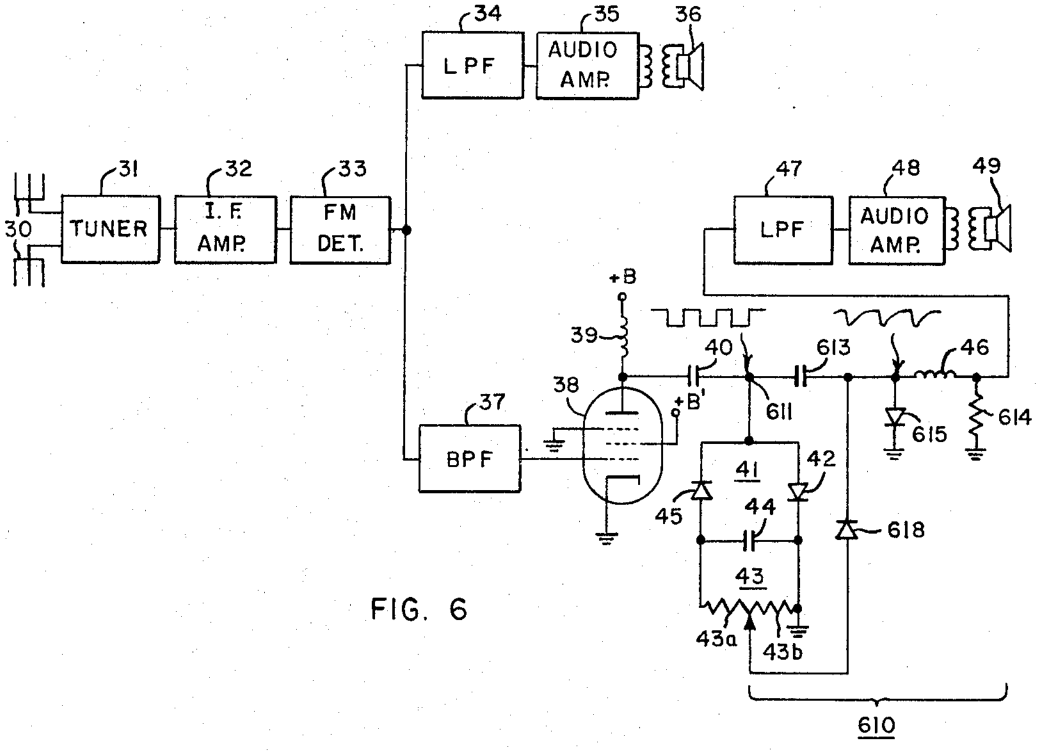

Referring to the drawings:

FIG. 1 is a circuit diagram illustrating the basic elements of a frequency detector constructed in accordance with the teachings of the present invention;

FIGS. 2, 3*a*, 3*b*, 4*a*, 4*b* and 5 are diagrams useful in explaining the operation of the present invention; and FIG. 6 is a block diagram, partly schematic, of an FM/FM multiplex receiver embodying the present invention therein.

*Description of FIG. 1 circuit*

FIG. 1 shows the basic circuit arrangement for a frequency detector constructed in accordance with the teachings of the present invention. Shown therein is a frequency detector 10 to which is supplied, at input terminals 11, a square-wave signal 12. Terminals 11 may comprise the output terminals of an amplitude limiter circuit wherein positive and negative portions of a frequency-modulated carrier wave signal are clipped off to form the desired square wave signal. Although signal 12 will be referred to hereinafter as a square-wave signal, it will be seen that the limited signal may not have a true square-wave form. Frequency detector 10 also includes a pulse-counter circuit consisting of capacitor 13, resistor 14, and diode 15 for deriving from the supplied square-wave signal a train of pulses 16 having an average component represenative of the frequency of signal 12. More specifically, capacitor 13 and resistor 14 form a differentiator circuit developing positive- and negative-going pulses from the respective vertical steps of square-wave signal 12. Diode 15 then effectively clips off the pulses of one polarity, in this case, the positive-going pulses, and additionally clamps the negative-going pulses 16 developed across resistor 14 to a convenient reference level such as ground potential, from which the average value of the pulse train may be measured.

Assuming that all of pulses 16 are constant in area, then any variation in the number of pulses per unit of time causes the average component of the pulse train to vary; and the number of pulses per unit of time, is in turn, determined by the frequency of the supplied square-wave signal. Thus, variations in the average component of the pulses are representative of the frequency modulation of the square-wave signal. In this way, the pulse-counter circuit operates as a frequency detector.

This explanation of the operation of the pulse-counter has been based on the assumption that the pulses are constant in area. However, as will be shown more fully hereinafter, any variations in the peak-to-peak amplitude of the square-wave signal 12 cause corresponding variations in the area of the pulses, with the result that the average component of the pulse train becomes representative not only of the frequency modulation of the square-wave, but also of any amplitude variation therein.

According to the invention, means are provided to alter nonlinearly the amplitude of the pulses 16, the amount of nonlinear alteration being adapted to substantially eliminate the effects that undesired amplitude variations in signal 12 have on the average component of the pulses at output terminals 17. The nonlinearity in the limiting operation assures that the amount of compression of the pulses is proportionately greater on pulses of one amplitude than on pulses of a different amplitude so that the area of the pulses is maintained constant whenever undesired amplitude variations in the supplied signal tend to vary the pulse area. In the circuit of FIG. 1, the nonlinear limiting is provided by diode 18, which is connected from the pluse-counter circuit to a source of negative potential −E and is poled so as to become conductive when the peaks of the pulses 16 extend more negative than potential —E. In the preferred form of the invention, therefore, the amount of limiting action is proportionately greater on higher amplitude pulses than on lower amplitude pulses. As will be seen in the operation of the frequency detector 10, this results in the derivation of substantially constant area pulses 16, thereby making the average amplitude of the pulses representative only of the frequency of the input signal 12.

Figure 2:
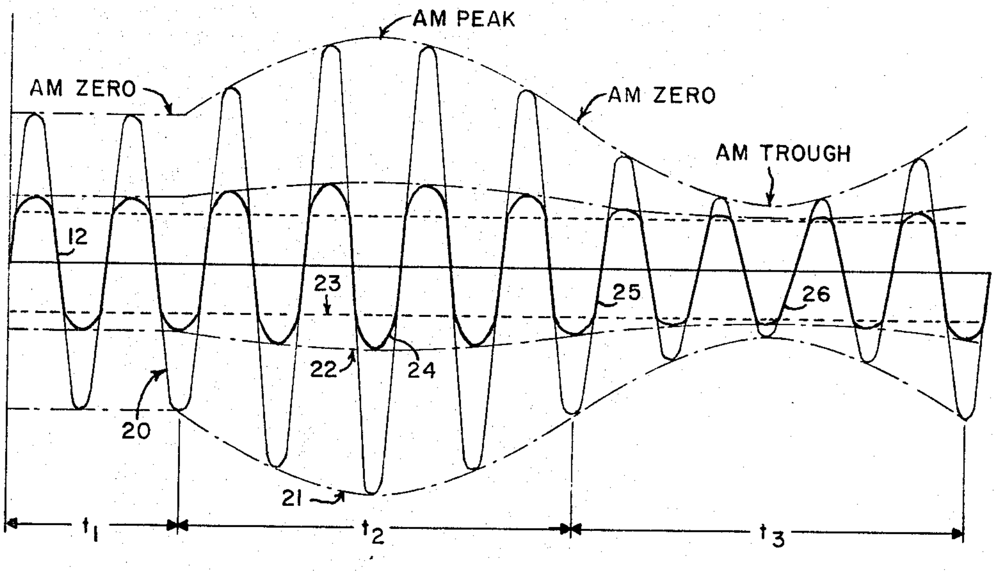

Before considering how the nonlinear limiting action provided by balancing diode 18 causes the pulse-counter circuit of frequency detector 10 to become amplitude-insensitive, it will be helpful to first consider in some detail how amplitude variations in the square-wave signal are detected in the absence of balancing diode 18. In FIG. 2 there is shown a carrier wave signal 20 on which some undesired amplitude modulation appears, as represented by the carrier envelope 21. For the sake of simplicity, the frequency modulation of signal 20 has been omitted. The heavy line 12 is the square-wave signal produced by amplitude-limiting carrier signal 20 in a limiter circuit that, ideally, would clip off the carrier at clipping level 23, but which may be ineffective to completely suppress the amplitude modulation on signal 20 Two features of square-wave signal 12 are of interest and should be noted here for a complete understanding of the invention. The first of these is that the slopes of the vertical sides of the square-wave signal 12 vary as the amplitude-modulation envelope 21 goes from a peak to a trough. The second is that the magnitude of thte rounded tops of the square wave also vary so as to be greater during an AM peak than during an AM trough. This is shown by the square-wave envelope 22. It should be noted that the relative magnitude of these rounded tops has been exaggerated in FIG. 2 for the sake of clarity. Referring to FIGS. 3 and 4, each of the aforementioned aspects of signal 12 and their respective effects on the pulses produced in frequency detector 10 will be considered separtely.

Figure 3A:
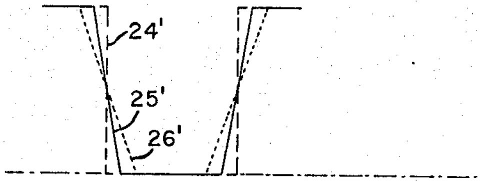
Figure 3B:
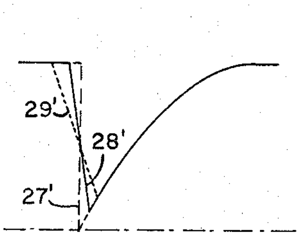

In FIG. 3*a*, three half cycles 24′, 25′ and 26′ corresponding to half cycles 24, 25 and 26 of the square-wave signal 12 occurring at the peak, zero point, and trough, respectively, of the AM envelope 21 are shown with their rounded tops removed, and superimposed so as to make the difference in side slopes readily apparent. It can be demonstrated by simple transient analysis that these square-wave cycles, when applied to the resistor-capacitor differentiator circuit, will produce the three pulses 27′, 28′, and 29′, respectively, as shown in FIG. 3*b*, with different peak amplitudes depending on the slope of the corresponding square-wave cycle. It can further be shown that, despite the varying peak amplitudes of the pulses, the area of each pulse remains constant. Therefore, since the average value of the pulses is a function of pulse area and not peak amplitude, the varying side slopes have no effect on the average value of the pulse train. Considering now the effect that the rounded tops have on the derived pulse, FIG. 4*a* shows the square-wave cycle 25, from FIG. 2, with the rounded top included. FIG. 4*b* shows the pulse 28 that is derived from such a rounded-top square-wave signal with the shaded region representing the increase in pulse area produced by the rounded top over the area of a pulse 28′ that would be produced from a flat-top square-wave. If the rounded top in FIG. 4*a* varies in magnitude, the shaded area in FIG. 4*b* will increase and decrease correspondingly, causing a variation in the pulse area which distorts the average amplitude of the pulses. In this way, the amplitude modulation of the carrier wave signal is detected in the pulse-counter circuit and reproduced in the following circuits along with any signal components representative of the frequency modulation of the carrier.

In FIG. 5, the input-output current-conducting characteristic of diode 18 is shown with the plate cathode bias set at potential —E. During the initial interval $t_1$, where there is no amplitude modulation of the carrier signal 20, as shown in FIG. 2, voltage pulses such as pulse 28 of FIG. 5 would be produced across resistor 14, except that when pulse 28 goes more negative than potential —E, a small percentage of the charging current, as represented by current pulse 28*a*, is supplied from balancing diode 18. This clipping, or limiting, of the voltage pulse across resistor 14 means that over a period of time the average charging current through resistor 14 has been proportionately reduced by an amount equal to the average current being supplied by balancing diode 18. During the interval $t_2$ of increasing amplitude modulation on the carrier signal 20, the increase in magnitude of the rounded tops on square-wave signal 12 requires a greater average amount of charging current.

However, there is also an increase in peak amplitude of the pulse represented in FIG. 5 by pulse 29. As a result the average current drawn from diode 18 is proportionately greater on the higher amplitude pulse 29 than on the lower amplitude pulse 28. Preferably, the proportionate increase in average current flow through diode 18 is sufficient to offset the added charging current resulting from the increase in the rounded top so that there is no net increase in the average current flowing through resistor 14. In this way, the increasing amplitude modulation has no effect on the output of the pulse counter. The operation during interval $t_3$, when the amplitude modulation envelope goes through a trough and lower peak amplitude pulses such as pulse 27 are derived, is just the opposite.

It will be appreciated that the peak amplitude of the pulses, which by themselves produce no effect on the average value of the pulse train, are advantageously used as the indicator of the amount of corrective action by balancing diode 18 needed to compensate for the effect of the rounded tops of the square wave on the average value of the pulse train. Furthermore, it should be noted that when limiting the amplitude of pulses 16 to get constant area pulses, no distortion of the quality of the output signal occurs, since the amplitude limiting serves only to alter the harmonic structure of the pulse train, and as long as the average value remains undistorted, it is immaterial what is done to the harmonic structure.

*Description of FIG. 6 receiver*

There is shown in FIG. 6 an FM/FM multiplex receiver embodying a more practical form of the present invention than that shown in FIG. 1. Specifically, the receiver includes the usual antenna 30, tuner 31, IF amplifier 32, and FM detector 33. The signal at the output of detector 33 comprises the main audio-frequency signal, which is separated out by low-pass filter 34, amplified in audio amplifier 35, and reproduced by loudspeaker 36. The signal at the output of detector 33 also includes the frequency-modulated subcarrier, which is separated out by bandpass filter 37 and amplified in pentode amplifier circuit 38, preferably having in the plate circuit thereof an inductor 39 which presents a high reactive impedance at the subcarrier frequency and little or no resistive impedance. The amplified subcarrier is then coupled by capacitor 40 to an amplitude-limiter circuit 41, coupled across the input terminals 611 of frequency detector 610. Limiter circuit 41 includes a pair of oppositely poled diodes 42, 45 to clip off those positive and negative portions of the subcarrier extending beyond the clipping level as determined by the average potential developed across the time constant circuit comprised of potentiometer 43 and capacitor 44. The result is a square-wave signal such as shown in FIG. 2, except that the clipping level will vary as a function of the strength of the subcarrier. The residual amplitude modulation results from the voltage produced by the current flow through the finite resistances of diodes 42 and 45. This type of limiter circuit is known as a variable threshold limiter circuit and is used advantageously herein to enable tracking of the average amplitude of the detected audio-frequency signal with the audio-frequency signal in the main channel 34–36. This aspect of the receiver shown in FIG. 6 constitutes the subject matter of applicant's copending application Serial No. 89,895, filed January 4, 1961, now U.S. Patent No. 3,163,717, which issued December 29, 1964. Use of this circuit is necessary in the case where it is desired to reproduce a stereophonic broadcast signal of the FM/FM multiplex type. The resistance value of potentiometer 43 is selected for the desired clipping level and the value of capacitor 44 is then chosen to maintain the clipping level in the presence of incidental amplitude modulation of the type shown in FIG. 2.

The frequency detector 610 is similar to that shown in FIG. 1 with corresponding circuit elements carrying the same reference numerals preceded by the number "6." In addition, inductor 46 is inserted in series with the resistor-capacitor differentiator circuit 613, 614 and is included specifically to improve the linearity and sensitivity of the detector, in accordance with the teachings of applicant's copending application Serial No. 84,636, filed January 24, 1961, now U.S. Patent No. 3,146,420, which issued August 25, 1964. The bias potential for balancing diode 618 is taken from a point on potentiometer 43 so that the point at which diode 618 becomes conductive is made variable, as determined by the strength of the subcarrier signal. In this way, diode 618 is made to conduct at some relative level of the derived pulses over the same portion of its nonlinear characteristic, regardless of the strength of the subcarrier signal. The pulses derived in frequency detector 610 are applied to low-pass filter 47 to derive an output signal proportional to the average value of the pulses, this derived signal then being applied to audio amplifier 48, wherein it is amplified, and then to loudspeaker 49.

The operation of frequency detector 610 is basically the same as that of FIG. 1, except for the variable bias on balancing diode 618, which means that the long-term average amplitude of the pulses can vary, but the rapid fluctuations are removed in the same manner as in the FIG. 1 circuit.

While applicant does not wish to be limited to any particular set of circuit constants, the following have proved useful in the frequency detector of FIG. 6:

| | |
|---|---|
| Potentiometer **43** | 25 kilohms with center tap adjusted for **15** kilohms to ground. |
| Resistor **614** | 33 kilohms. |
| Capacitor **40** | 1000 micromicrofarads. |
| Capacitor **613** | 100 micromicrofarads. |
| Capacitor **44** | 8 microfarads. |
| Inductor **39** | 50 millihenries. |
| Inductor **46** | 50 millihenries. |
| All diodes | 1N34AS. |
| Subcarrier frequency with frequency deviation | 42 kilocycles. ±10 kilocycles. |

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Balanced frequency detector apparatus, comprising:
means for supplying a frequency modulated wave signal subject to undesired peak-to-peak amplitude variations;
means for differentiating said wave signal and for rectifying said differentiated signal to derive a first train of same polarity pulses having an average component jointly representative of the frequency and amplitude variations of said signal;
and means responsive to the peak amplitude of said pulses for nonlinearly limiting said first train of pulses such that pulses of higher peak amplitude are limited to a proportionately greater extent than pulses of lower peak amplitude, thereby developing a train of output pulses having an average component representative of the frequency of said wave signal and being substantially free from the effects of said undesired amplitude variations.

2. Balanced frequency detector apparatus, comprising:
means for supplying a frequency modulated carrier wave signal subject to undesired amplitude modulation;
means for amplitude limiting said carrier signal, said limited signal having undesired peak-to-peak amplitude variations representative of said undesired amplitude modulation;
means for differentiating said limited signal and for rectifying said differentiated signal to derive a first train of same polarity pulses having an average component jointly representative of the frequency and amplitude variations of said limited signal;
and means responsive to the peak amplitude of said pulses for nonlinearly limiting said first train of pulses such that pulses of higher peak amplitude are limited to a proportionately greater extent than pulses of lower peak amplitude, thereby developing a train of output pulses having an average component representative of the frequency of said wave signal and being substantially free from the effects of said undesired amplitude variations.

References Cited by the Examiner

UNITED STATES PATENTS

| | | | |
|---|---|---|---|
| 2,861,185 | 11/1958 | Hopper. | |
| 3,128,437 | 4/1964 | Loughlin | 329—133 |
| 3,146,402 | 8/1964 | Loughlin | 329—134 X |
| 3,163,717 | 12/1964 | Loughlin | 329—134 X |
| 3,205,448 | 9/1965 | Bahrs et al. | 329—134 X |

ROY LAKE, *Primary Examiner.*

A. L. BRODY, *Assistant Examiner.*